No. 704,598. Patented July 15, 1902.
S. UDSTAD.
ROD PACKING.
(Application filed Apr. 20, 1901. Renewed June 18, 1902.)
(No Model.)
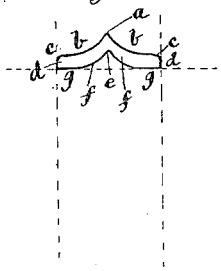
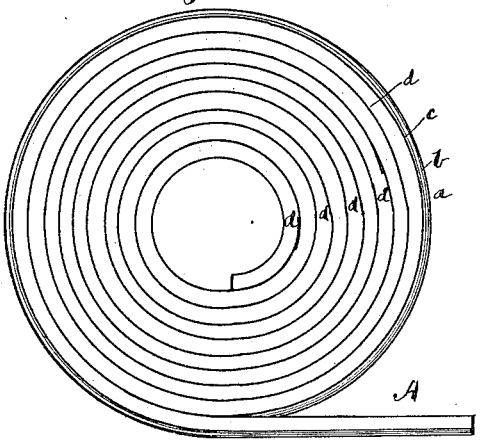
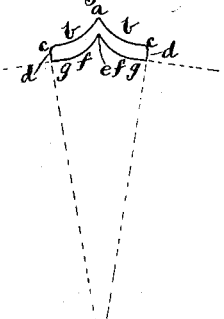
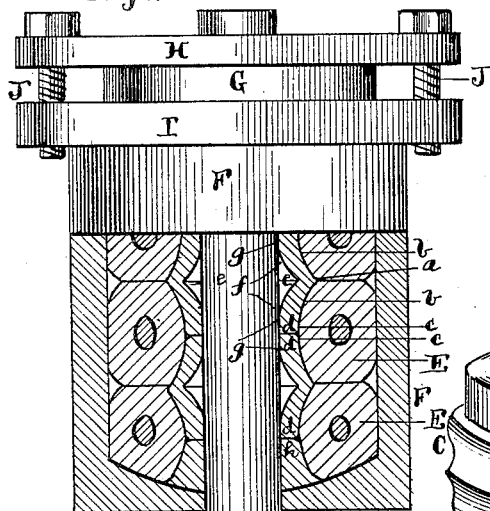
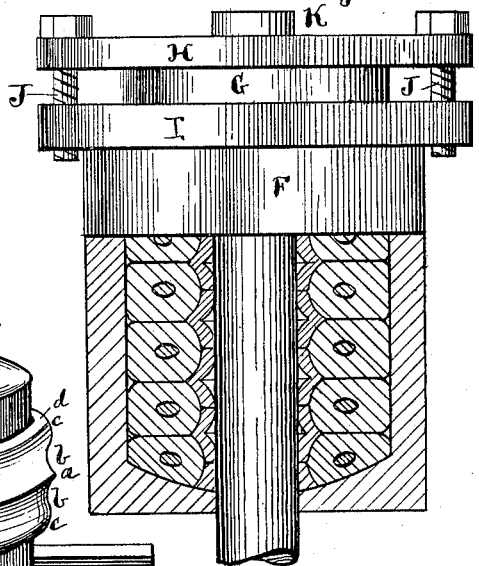
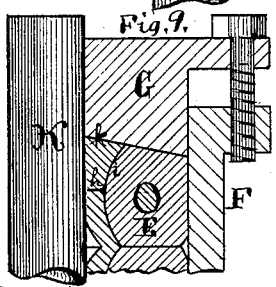
Witnesses,
Samuel W. Banning.
Thomas B. McGregor
Inventor.
Sivert Udstad.
By Banning & Banning,
Atty's.
THE NORRIS PETERS CO., PHOTO-LITHO., WASHINGTON, D. C.

UNITED STATES PATENT OFFICE.

SIVERT UDSTAD, OF AURORA, ILLINOIS.

ROD-PACKING.

SPECIFICATION forming part of Letters Patent No. 704,598, dated July 15, 1902.

Application filed April 20, 1901. Renewed June 18, 1902. Serial No. 112,174. (No model.)

*To all whom it may concern:*

Be it known that I, SIVERT UDSTAD, a citizen of the United States, and a resident of Aurora, in the county of Kane and State of Illinois, have invented a certain new and useful Improvement in Rod-Packing, of which the following is a specification.

This invention relates to rod-packing composed partly of metal, usually in the form of rings encircling and bearing directly against the rod, and fibrous elastic or other suitable rings which engage with the periphery of the metal rings and form in conjunction therewith a steam and water tight joint through which steam or water cannot leak from one ring to another. The practice heretofore has been to make up the metal rings in the form of split rings, so that they can be separated at the split joint and sprung sidewise far enough to allow the ring to be slipped over the rod or other device with which it is necessary or desirable to use the packing. The rings are formed of specific diameter, necessitating the keeping on hand of a supply of rings of different diameters where rods of varying diameters have to be packed, and, again, the ring may not be of a proper diameter to fit the rod, requiring a new set of packing-rings to be furnished or changing the rings on hand, if possible so to do, to adapt them for use with the rod, and, again, with separate rings made up at the factory the rings have to be nested in packing or otherwise brought together for shipment, which requires more or less space, according to the number and size of the rings, and, again, with separate loose rings there is more or less liability of mislaying or losing the rings. These several objections while they do not affect the utility of the metal packing-rings for use are nevertheless objections which it is desirable to overcome; and the object of this invention is to avoid the objections above enumerated and other objections, to which end the invention consists in forming a metallic strip having the requisite contour on its exterior and interior faces and adapted to be rolled into a compact form and capable of being cut into proper lengths for use with rods of varying diameters; and the invention further consists in the features of construction for the metallic strip and in the combination of parts hereinafter described and claimed.

In the drawings illustrating the invention, Figure 1 is a plan view showing the strip in its rolled form; Fig. 2, an end view showing the form of the strip as to its exterior and interior surfaces and its side edges as it comes from the forming-die; Fig. 3, an end view of the strip, showing the formation thereof when in place around a rod; Fig. 4, a perspective view showing a rod and the method of forming a ring from the strip section or length at the lower portion of the figure and showing also a complete ring on the upper portion of the figure; Fig. 5, an elevation of a section or length of metal strip for use as a half-ring and showing the exterior face of such strip; Fig. 6, an end elevation of the strip shown in Fig. 5; Fig. 7, an elevation of a stuffing-box and rod, showing the metallic strip-rings of the invention and fibrous elastic packing-rings between the metallic rings and the wall of the stuffing-box; Fig. 8, a similar view to Fig. 7, showing metal packing-rings formed from the strips of the invention in connection with fibrous elastic packing-rings differing in form from the rings of Fig. 7 and with the metallic strip packing-rings of a less width than in Fig. 7; and Fig. 9 a detail in section, showing a half-metal packing-ring at the outer end of the stuffing-box.

The metal for the strip or ribbon to be formed into packing-rings can be lead or other suitable metal that will readily flex or bend and which can be easily severed into the proper lengths to produce the packing-rings. The metal for the ribbon or strip is drawn through suitable dies, so as to make the ribbon or strip A of the proper length. The dies are so constructed as to draw the ribbon or strip into a shape or form having a central apex $a$, with curved faces $b$ on its exterior, terminating in rounded corners $c$, and having side edges $d$ and an interior having a depressed center $e$, with curved faces $f$ and flat faces $g$ between the terminal of the curved faces and the side edges $d$, and when first drawn the strip is of the formation shown in Fig. 2, the side edges $d$ being on a radial line, so to speak, while the flat faces $g$ are at right angles to the side edges. This formation of the faces and side edges of the strip or ribbon enables the winding or coiling of the strip or ribbon into a roll, as shown in Fig. 1, and in so coiling or winding the formation of the faces and edges, as shown in Fig. 2, permits a very close winding or coiling, as the interior face will fit snugly over the exterior face, the two sides or halves of the strip or ribbon on the center line of the apex $a$ and the depression $e$ allowing of such winding or coiling.

The strip or ribbon of metal wound or coiled, as shown in Fig. 1, is very compact and is in the best possible shape for handling and shipping and being a continuous strip or ribbon will not be mislaid or easily lost. The metal strip or ribbon in use is to have a sufficient length thereof for the size of packing desired severed or cut off, and the section or length B so removed is formed into a packing-ring by winding it around a mandrel or other appliance or device of a circular shape and of the proper diameter to form a ring of the size to fit the rod. The manner of forming is shown in Fig. 4, where the section or length of metal strip or ribbon B is shown partly wound around the forming die or device, and the complete packing-ring C is also shown. The formation of the complete ring C is easily attained, owing to the nature of the metal from which the ribbon or strip is formed, which permits the section or length for the packing-ring to be readily and easily wound into the ring shape.

The packing-rings C after their formation are slipped onto the rod, and, as shown, in packing the rod of Figs. 7 and 8 a half-ring is employed. This half-ring D is formed of a strip of soft metal forged by dies and wound or coiled, as described, for the formation of the ribbon or strip A, and the strip or ribbon for the half-rings is severed or cut off into the requisite length and wound on a mandrel or other device suitable for the purpose, as in the formation of rings C. The strip for making the half-rings D is drawn through a die or otherwise, so as to have a straight edge $h$, a concave curved edge $i$, an apex $j$, a curved edge $k$, and a flat face $l$; but the contour of the edges and faces can be changed, especially as regards that of the edge $k$, which should be of a formation to fit snugly against the bottom of the stuffing-box.

The packing is inserted in the stuffing-box around the rod by first slipping the half-ring D on the rod and entering the same into the stuffing-box for its edge $k$ to fit against the bottom of the box and its interior face $l$ to lie against the periphery of the rod and with its concave curved face $i$ on the exterior and its flat edge $h$ at right angles to the rod. A fibrous packing-ring E is inserted into the stuffing-box to engage the wall of the box and the exterior face of the half-ring, and a full ring C is slipped onto the rod and entered into the box for its edge face $d$ to abut snugly against the edge face $h$ of the half-ring and with its flat faces $g$ to press and fit against the periphery of the rod and its curved face of one half or division to press against the fibrous or elastic packing-ring E, and in inserting and locating the full packing-ring it should be made to break joints with the half-ring. Another fibrous or elastic packing-ring E is then inserted into the stuffing-box to press against the first one and against the curved face of the first full-metal packing-ring, and another metal packing-ring is slipped onto the rod and entered into the stuffing-box for its edge $d$ to abut against the edge $d$ of the first one entered and for its flat faces $g$ to press and lie against the periphery of the stuffing-box, and another fibrous ring is then inserted, followed by another metal packing-ring, and so on until the stuffing-box is completely filled with the packing. The fibrous or elastic packing lies between the metal packing-rings and the wall of the box, and in each instance the fibrous packing-ring breaks joint with a metal packing-ring, and, as shown in Figs. 7 and 8, at the joints of the metal packing-rings the fibrous ring does not enter the groove or channel formed by the curved edges $c$, thus preventing the fibrous packing from being caught and pinched in the joint, throwing the rings out of line.

The stuffing-box F can be of any of the usual and well-known forms of construction, having a suitable gland G to enter the chamber of the stuffing-box, as usual, and, as shown, the gland has a rim or flange H and the stuffing-box has a rim or flange I, by means of which and suitable bolts J the gland can be forced into the stuffing-box to properly compress the packing. The packing, when in the box complete, by means of the curved faces $f$ forms a series of channels around the rod, which by becoming filled with water and oil make an efficient water packing to assist in lubricating the rod and still more reducing the friction between the rod and the packing. The flat faces $g$ of the metal packing-rings furnish a small bearing-face for friction and at the same time are sufficient for packing purposes. The packing-rings made of the soft-metal strip or ribbon can be cut of the requisite length to suit the diameter of the rod, and in the event of a less width of strip being used the fibrous packing can be formed accordingly, as shown in Fig. 8, so as to fill the space between the rings and the wall of the stuffing-box. The curved exterior faces $b$ of the strip or ribbon when the rings are inserted in the stuffing-box and encircle the rod form a full semicircle for the face of the fibrous ring, as shown in Figs. 7 and 8, thereby insuring a tight joint between the curved faces of the metal rings and the faces of the fibrous or elastic packing.

The strip or ribbon wound or coiled is in the best shape possible for shipment and use, as it will occupy but a small space and is in an exceedingly compact shape. The wound or coiled ribbon or strip can have the requisite length for the packing-ring opened out and severed or cut off, and the section or length so severed or cut off can be readily formed into a packing-ring, and the metal packing-ring thus formed can be made to accurately fit the rod. The strip or ribbon can be cut off or severed into lengths, so as to produce a perfect fit for the metal packing-ring around the rod, thus avoiding any mistakes in measurement and consequent ill-fitting, as might be the case with the old form of made-up metal packing-rings, and by means of the strip or ribbon of metal packing of my invention the rings can be formed as required for use, thus avoiding the necessity of sending for new rings when the rings become worn out or of keeping on hand an extra supply of formed rings, as it is only necessary in replacing the rings to cut off sections or lengths and form the same into the metal packing-rings, thus enabling the repairs to be made at once by the engineer or other operator or workman. The strip or ribbon of metal packing made in accordance with my invention will be found exceedingly useful and will result in a great saving of time and repair in use.

A half-metal packing-ring can be used at the outer end of the stuffing-box as well as at the inner end, and a half-ring located at the outer end of the stuffing-box is shown in Fig. 9. This half-ring is of the same general contour as to its faces as the half-ring at the inner end of the stuffing-box, and the end face of the gland which contacts the stuffing has a curved bearing-face; but it will be understood that the bearing-face of the gland can be a straight one in a plane at right angles to the rod or in a plane having an incline in relation to the rod, and the engaged face of the half-metal packing-ring can have a contour corresponding to the end face of the gland. The two half-rings for the inner and outer face of the stuffing if similar one to the other can be cut and formed from the same strip or ribbon, thus saving the necessity of a multiplicity of strips or ribbons; but the two rings could have a different contour, in which case the strips or ribbons from which the respective rings are cut and formed would have different contours for their faces, the faces of the strips or ribbons corresponding to the faces of the respective half-rings.

Although this packing is illustrated as rolled or coiled for shipment and use, it is not the intention thereby to confine the manner of putting up the packing in a rolled form, as it may be desirable to ship the packing cut in suitable lengths and packed in boxes.

What I regard as new, and desire to secure by Letters Patent, is—

1. A pliable metallic strip or ribbon for use in making packing-rings, the strip or ribbon having, first, an exterior face comprising a centrally longitudinal ridge or apex and an inwardly-curved or concave surface on each side of the ridge or apex, each inwardly-curved or concave surface adapted to receive a portion of the curved exterior of a compressible or fibrous packing-ring, and having, second, an interior face comprising a central longitudinal channel or depression in line with the exterior ridge or apex and an outwardly-curved or convex surface on each side of the channel or depression forming a longitudinal groove or passage, with the outer concave and inner convex surfaces on different lines of curvature to give an increased thickness to the outer edge on each side and furnish a narrow flat bearing or contact face on the interior of the ring, when in place, without destroying the curvature of the faces, substantially as described.

2. A pliable metallic strip or ribbon for use in making metallic packing-rings wound on itself into a roll and adapted to be unwound and cut into sections each section of a length for the diameter of ring desired, the strip or ribbon having, first, an exterior face comprising a central longitudinal ridge or apex and inwardly-turned or concave surfaces on each side of the ridge or apex and having, second, an interior surface comprising a central longitudinal channel or depression, and an outwardly-curved or convex surface on each side of the channel or depression forming a longitudinal groove or passage, with the concave and convex surfaces on different lines of curvature giving an increased edge thickness and furnishing on each side a flat narrow edge forming a bearing or contact face, substantially as described.

3. A pliable metallic strip or ribbon for use in making metallic packing-rings, the strip or ribbon having, first, an exterior face comprising a central longitudinal ridge or apex and an inwardly-curved or concave surface on each side of the ridge or apex and having, second, an interior face comprising a longitudinal channel or depression and an outwardly-curved or convex surface on each side of the channel or depression and forming a groove or passage in the inner face of the ring and having, third, a straight face on each side edge with a rounded corner at the juncture of each side edge face and the exterior curved surface leaving, when two rings abut each other on the side edge faces, a shallow channel or depression at the exterior corner edges, substantially as described.

4. A pliable metallic packing-ring having on its exterior two inwardly-curved or concave surfaces, one on each side of the transverse center, the curvature of the surfaces forming a central ridge or apex on the exterior face of the ring, and having on its interior face two outwardly-curved or convex surfaces, one on each side of the transverse center, the curvature of the surfaces forming a central channel or depression in the interior face of the ring, and having a straight face on each side edge when the ring is in place, said packing-ring being formed of a section cut from a continuous strip of pliable metal having an exterior and interior contour corresponding to the exterior and interior faces of the ring, substantially as described.

5. A series of pliable metallic packing-rings, each formed of a section cut from a continuous strip or ribbon of pliable metal and each having on its exterior two inwardly-curved or concave surfaces, one on each side of the transverse center, the curvature of the surfaces forming a central ridge or apex on the exterior face of each ring, and each having on its interior face two outwardly-curved surfaces, one on each side of the transverse center, the curvature of the two faces forming a central channel or depression on the interior face of each ring, the adjoining curved surfaces on the exterior of the rings forming between two rings a semicircular groove or recess and the curved surfaces on the interior face of each ring forming a groove or passage, in combination with a series of compressible or fibrous packing-rings, each ring having a curved exterior surface to enter and fit the semicircular groove or recess formed by the inwardly-curved or concave exterior surfaces of two abutting metal rings, for the compressible packing-ring to close the joint between the two metal rings, substantially as described.

6. A series of pliable metallic packing-rings, each having on its exterior face two inwardly-curved or concave surfaces, one on each side of the transverse center, the curvature of the faces forming a central ridge or apex on the exterior face of each ring and having on its interior face two outwardly-curved or convex surfaces, one on each side of the transverse center, the curvature of the two surfaces forming a central channel or depression on the interior face of each ring and having a straight face on each side edge of each ring, with a rounded corner at the juncture of each side edge face and the exterior curved surface, the exterior curved surfaces of two abutting rings forming a semicircular groove or channel and the curved surface on the interior of each ring forming a groove or passage, in combination with a compressible or fibrous packing-ring for each semicircular groove or recess, said ring having a curved exterior face fitting into the semicircular groove or recess of the exterior surfaces of two abutting metal rings and clearing the channel or depression formed by the rounded corner edges of the two rings, substantially as described.

7. A pliable metallic strip or ribbon for use in making half packing-rings, the strip or ribbon having an exterior face with a curved surface, a narrow face on one side edge, a wide face having a curved surface on the opposite side edge an interior face having a straight surface, and having, at the juncture of the curved surface of the exterior face and the curved surface of the wide edge side face, an apex or ridge, substantially as described.

8. A pliable metallic strip or ribbon for use in making half packing-rings wound on itself and adapted to be unwound and cut into sections each section of a length for the diameter of half-ring desired, the strip or ribbon having an exterior face with a curved surface, a narrow face on one side edge, a wide face having a curved surface on the opposite side edge, an interior face having a straight surface and having at the juncture of the curved surface of the exterior face and the curved surface of the wide edge side face, an apex or ridge, substantially as described.

9. A pliable metallic half packing-ring having an exterior face with an inwardly-curved or concave surface, a side edge face with a narrow surface, a side edge face with an outwardly-curved or convex wide surface and an interior face having a straight surface, and formed from a section cut from a continuous strip or ribbon of pliable metal having faces corresponding to the contour of the faces of the ring, substantially as described.

10. A pliable metallic strip or ribbon for use in making packing-rings wound on itself into a roll said ribbon or strip provided on its exterior face with a central ridge or apex and an inwardly-curved or concave surface on each side of the ridge or apex and provided on its interior face with a central longitudinal channel or depression and an outwardly-convex surface on each side of the channel or depression and provided on each side edge with a straight face, the side edges when the strip or ribbon is first formed having their faces oppositely inclined giving the inner face a spread or opening for the entrance of the exterior face, in winding the ribbon on itself, without disturbing the continuity of the surfaces, substantially as described.

SIVERT UDSTAD.

Witnesses:
THOMAS B. McGREGOR,
SAMUEL W. BANNING.